E. H. ANGELL.
WAVE MOTOR.
APPLICATION FILED MAR. 14, 1908.
967,101.
Patented Aug. 9, 1910.
4 SHEETS—SHEET 1.
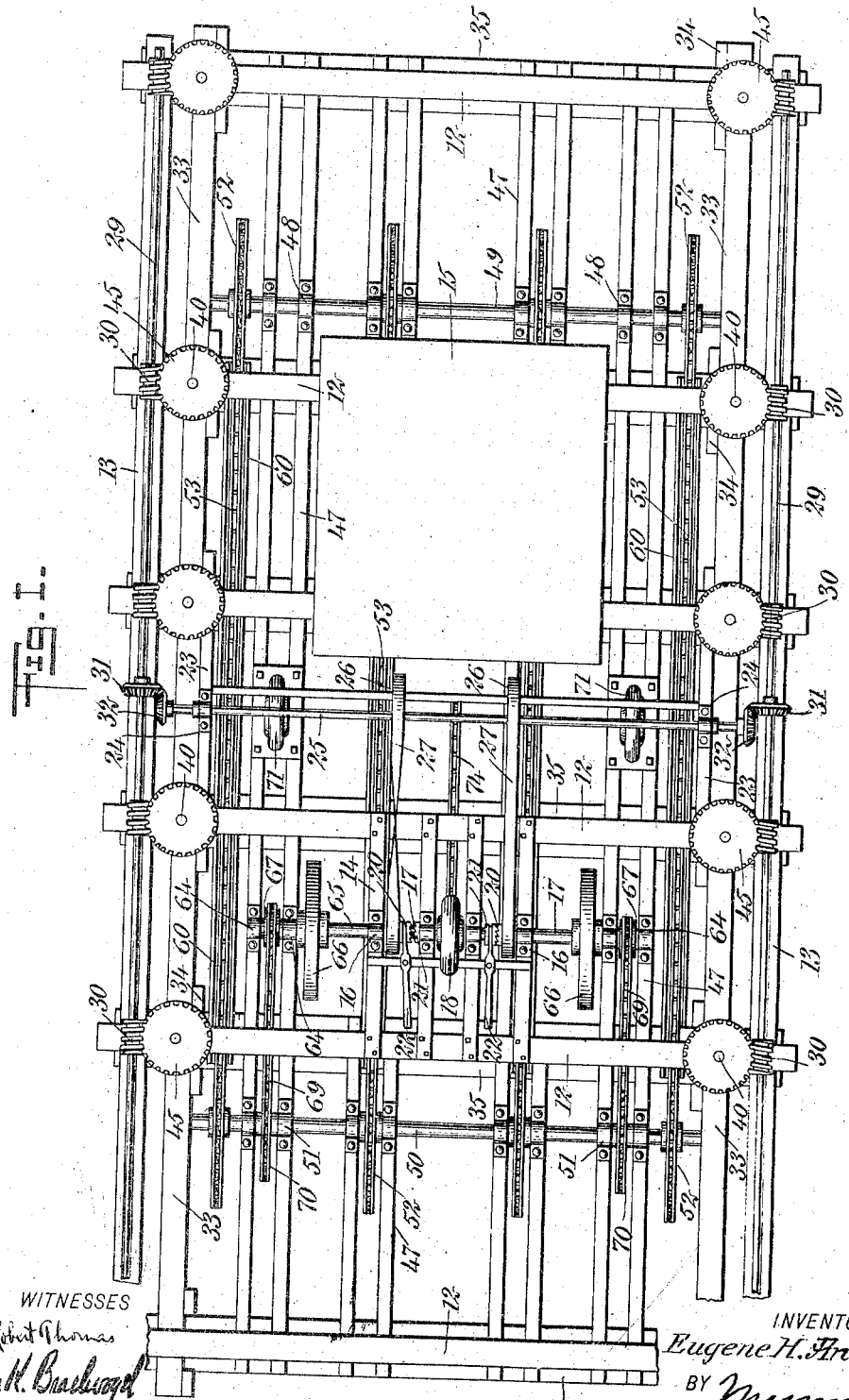
WITNESSES
INVENTOR
Eugene H. Angell
BY Munn & Co
ATTORNEYS

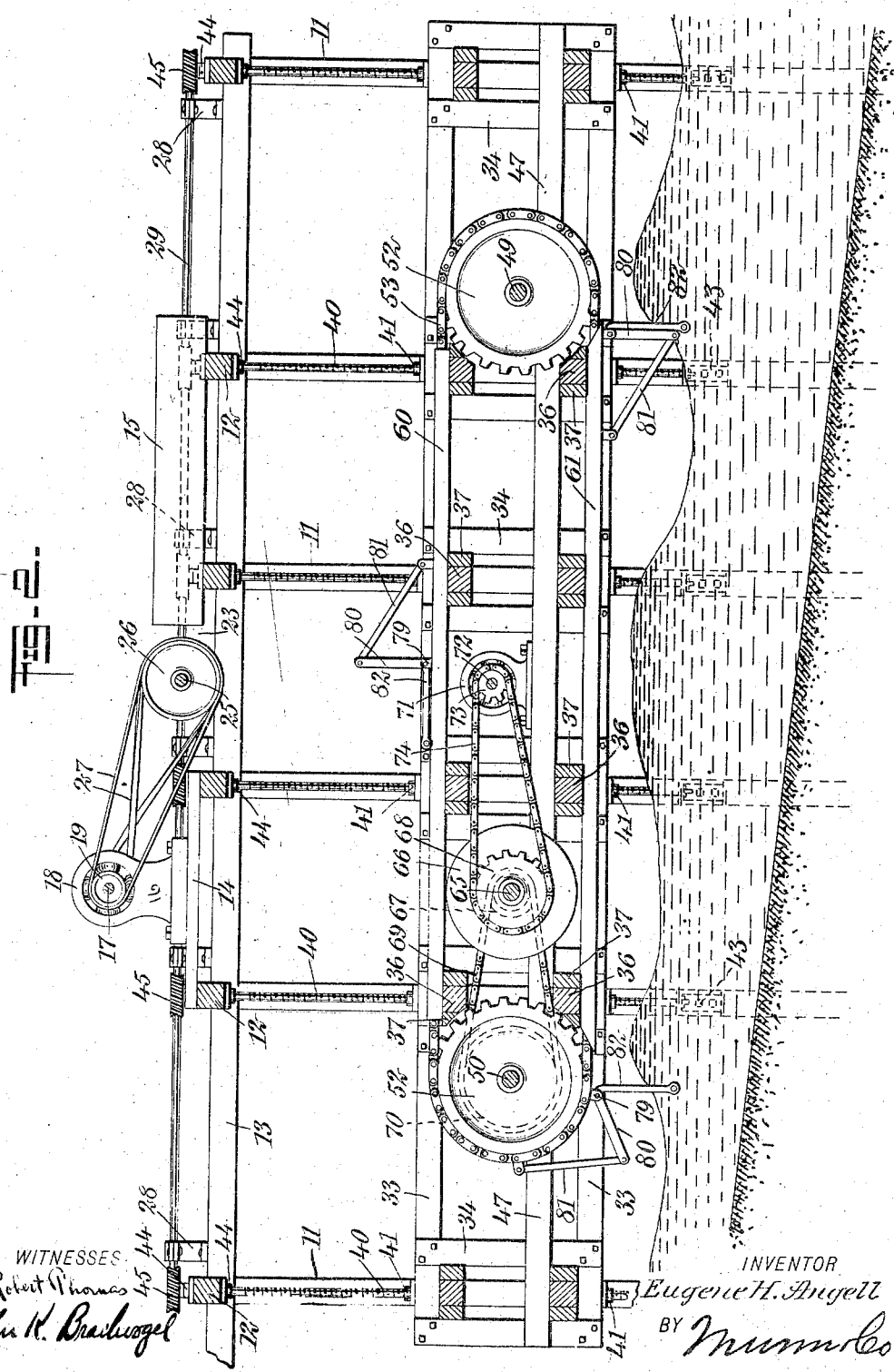

E. H. ANGELL.
WAVE MOTOR.
APPLICATION FILED MAR. 14, 1908.
967,101.
Patented Aug. 9, 1910.
4 SHEETS—SHEET 3.
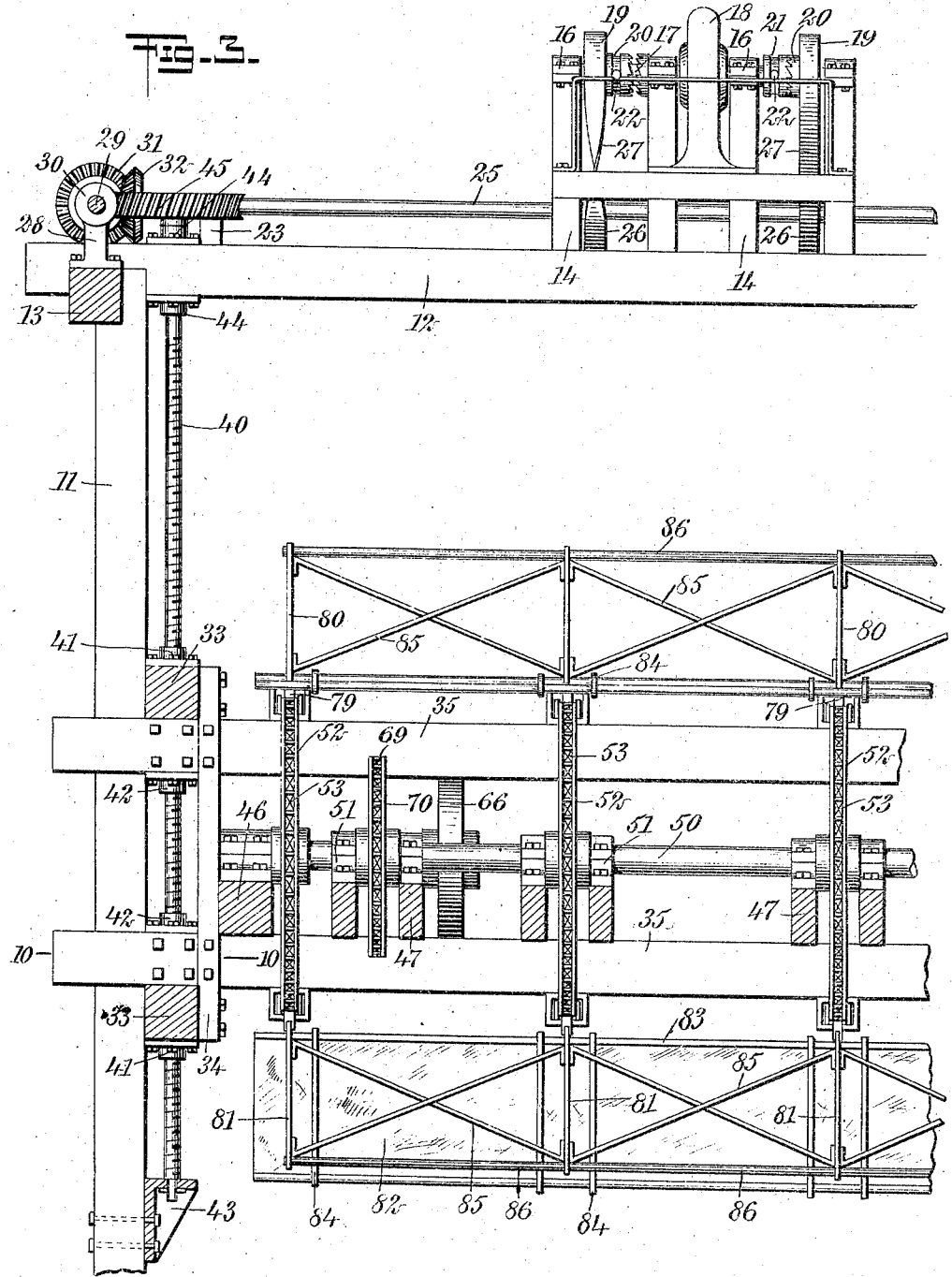

E. H. ANGELL.
WAVE MOTOR.
APPLICATION FILED MAR. 14, 1908.
967,101.
Patented Aug. 9, 1910.
4 SHEETS—SHEET 4.
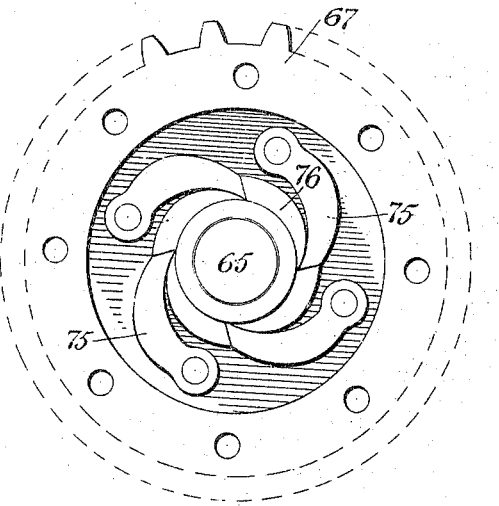
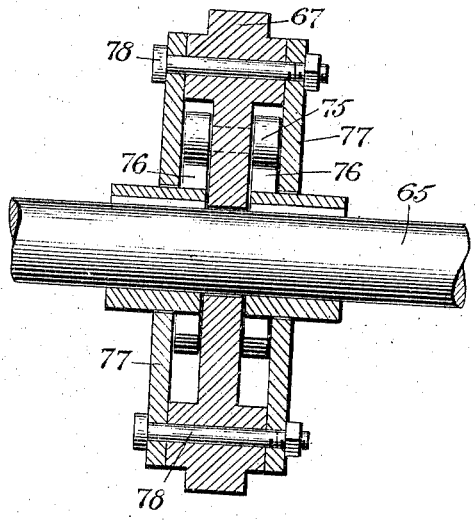
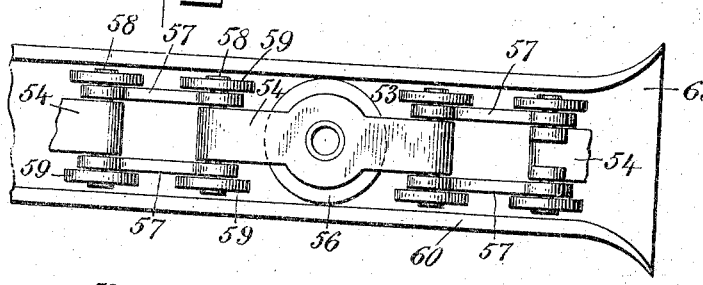
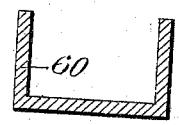
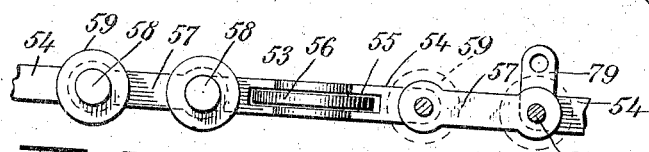
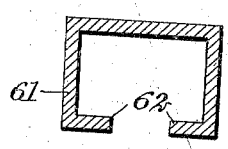
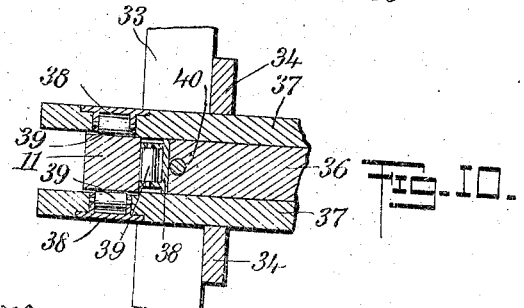
WITNESSES
G. Robert Thomas
John K. Brackeryel
INVENTOR
Eugene H. Angell
BY Munn & Co.
ATTORNEYS

UNITED STATES PATENT OFFICE.

EUGENE H. ANGELL, OF BERKELEY, CALIFORNIA, ASSIGNOR OF ONE-HALF TO ANNIE M. ANGELL, OF BERKELEY, CALIFORNIA.

WAVE-MOTOR.

967,101. Specification of Letters Patent. Patented Aug. 9, 1910.

Application filed March 14, 1908. Serial No. 421,002.

*To all whom it may concern:*

Be it known that I, EUGENE H. ANGELL, a citizen of the United States, and a resident of Berkeley, in the county of Alameda and State of California, have invented a new and Improved Wave-Motor, of which the following is a full, clear, and exact description.

This invention relates to wave motors, and more particularly to wave motors which can be adjusted to allow for tidal or other variations in the water level, and which have continuously traveling series of vanes arranged to receive the water impact, and transform the interrupted and discontinuous movement of the waves or other water fluctuations, into substantially continuous power-producing movements of the mechanism.

More specifically, the invention relates to wave motors supported on piles driven into the ground at the shore or into the bottom at the littoral, and comprising a platform adjustably mounted upon the piles, power-driven means for raising and lowering the platform, and series of vanes arranged to travel continuously and to receive the impact of the waves, the vanes being arranged to swing into inoperative positions when they are moving in a direction opposite to the direction of the wave movement.

An object of the invention is to provide a simple, strong and efficient wave motor for transforming the power of the waves into useful energy, which can be adjusted to allow for tidal and other water level variations, and which itself, produces the power for so adjusting it.

A further object of the invention is to provide a device of the class described in which the power of the waves is transformed into a continuous, useful power-producing movement of the mechanism, by means of a series of vanes secured to flexible endless members such as chains, and arranged to be positioned operatively when moving in the direction of movement of the waves, and inoperatively when moving in an opposite direction, so that a return movement of the water, that is, a movement counter to the direction of the wave movement, does not retard the operation of the motor or decrease the power produced thereby.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of the wave motor; Fig. 2 is a longitudinal section of the same; Fig. 3 is an enlarged transverse section of a part of the motor showing the series of vanes and the adjusting mechanism; Fig. 4 is an enlarged side elevation of a detail of the connecting means between the wave-actuated mechanism and the power producing mechanism; Fig. 5 is an enlarged transverse section of the detail shown in Fig. 4; Fig. 6 is an enlarged plan view showing a part of one of the chains which carry the vanes, and a guide channel in which it travels; Fig. 7 is an enlarged side elevation of one of the vane-carrying chains, showing a link in longitudinal section; Fig. 8 is an enlarged transverse section of one of the guide channels for the chains; Fig. 9 is a similar view of another of the guide channels; and Fig. 10 is a transverse section on the line 10—10 of Fig. 3, showing the means for guiding the platform to adjust it longitudinally of its supporting piles.

Before proceeding to a more detailed explanation of my invention, it should be understood that the wave motor can be mounted at any suitable point of the seashore or other littoral, preferably where the wave movements are more or less regular. At certain points of the sea-coast there are sand banks or the like which effect a certain uniformity and regularity in the waves, and my motor can be most advantageously positioned at a point such as this. However, it will be found useful wherever there are wave or other water movements which can serve to propel the vanes to produce power. The platform which carries the vanes, as well as the power-producing means, is adjustable to allow for tidal and other variations, and to permit the mechanism to be raised substantially above the surface of the water in case of heavy storms and the like, during which waves of excessive size might damage the structure. Having shown for example, electric motors, as the power-producing mechanism, I wish to emphasize that I am not limited to this particular form of motor, and if so desired, can employ others, for example air-compressors, with means for storing the compressed air to generate power. I provide power-driven means for raising and lowering the wave motor mechanism, and this mechanism is operated by means of the power developed by the wave motor itself. The vanes, which are operated by the wave or other movement, are carried by continuous flexible members, preferably chains or belts, the runs of which are substantially horizontal. When the vanes are arranged at the lower runs of the chains they are engaged by the waves and are then operatively positioned in planes substantially perpendicular to the runs of the chains. When the vanes are at the upper runs, that is, the runs which move counter to the wave movement, they are inoperatively positioned, and lie in planes parallel to the planes of the upper runs, the vanes being pivotally mounted for this purpose. Consequently, any return wave movement cannot engage the vanes to retard the action of the wave motor or decrease the power produced thereby.

Referring more particularly to the drawings, I provide piles 11 preferably of wood, and of any suitable form, and driven into the seashore or the water bottom, in substantially perpendicular positions. The piles 11 are connected at the upper ends by transverse beams 12 bolted or otherwise fastened. At the upper ends, the piles carry longitudinal stringers 13, bolted or otherwise secured in place. Certain of the beams 12 are connected by longitudinal floor members 14, while others carry a casing 15 for electric storage batteries or accumulators. The floor members 14 have bearings 16 arranged thereon, in which is journaled a shaft 17. The shaft 17 is driven by an electric motor 18 and has pulleys 19 loose thereon. Each of the pulleys 19 has a rigid clutch section 20 adapted to mesh with a clutch section 21 slidable upon the shaft 17 and constrained to rotate therewith. Hand levers 22 control the clutch sections 21 and permit the engagement thereof with the rigid clutch sections 20, through the manual operation of the levers.

Adjacent to the stringers 13, certain of the beams 12 have supports 23 carrying bearings 24 in which is journaled a shaft 25 having pulleys 26 rigid therewith. The pulleys 26 are alined with the pulleys 19 and operatively connected with the same by means of belts 27. One of the latter has the runs crossed so that the shaft 25 can be driven in either direction from the shaft 17, accordingly as one or the other of the pulleys 19 is rigidly connected with the shaft 17 by means of the clutch sections. The stringers 13 carry bearings 28 in which are journaled longitudinal shafts 29 having rigid worms 30 thereon, and which are operatively connected with the shaft 25 by means of bevel gears 31 and 32.

At the sides of the piles 11 are arranged longitudinal frames 33 spaced apart and above one another, and connected by braces 34 bolted or otherwise secured in position. The frames 33 are movably arranged with respect to the piles and are joined by transverse frames 35 arranged in spaced pairs above one another. The frames 35, each comprise a central member 36, and side members 37 extending beyond the central member at the ends, and straddling the piles 11 as is shown most clearly in Fig. 10. At the ends, the central member 36, and side members 37, of each of the transverse frames, have brackets 38, set in suitable recesses and provided with rollers 39 which engage the piles 11 and permit the movement longitudinally of the same, of the frame, with a minimum of friction.

At each of the piles 11, and longitudinally thereof, is positioned a threaded rod 40 passing through suitable openings of the frames 33 and the transverse frames 35. The frames 33 have interiorly threaded sleeves 41 rigidly bolted or otherwise secured thereto, and the transverse frames 35 are provided with similar sleeves 42. The threaded rods 40 pass through the sleeves and are threaded to correspond to the interior threads of the same. The lower ends of the rods 40 are journaled upon suitable brackets 43, bolted or otherwise fastened to the piles 11. The upper ends of the rods 40 pass through suitable openings of the beams 12, and through bearing collars 44 of the latter, which are mounted in position by means of screws or bolts. At the upper ends, that is, the ends projecting above the beams 12, the rods have worm wheels 45 which mesh with the worms 30 of the rods 29. It will be understood that as the threaded rods 40 are turned, the threaded engagement of the same with the collars 41 and 42 tends to raise or lower the frames 33 and 35, which constitute the platform for the wave actuated mechanism. The shafts 29 are driven from the shaft 25 which can be rotated in one direction or the other, and can be driven by the motor 18.

Upon the lower transverse frames 35 are positioned longitudinal stringers 46 adjacent to the braces 34, and between the stringers 46 are arranged longitudinal floor beams 47 which have bearings 48 mounted thereon, in which is journaled a shaft 49. A shaft 50 is journaled in bearings 51 carried by the floor beams 47 and is substantially parallel to the shaft 49. The shafts 49 and 50 have pluralities of sprocket wheels 52, operatively connected by chains 53. The chains 53 are formed from single links 54 having slots 55 therethrough in which are pivotally mounted guide rollers 56, and joining them, double links 57 arranged at both sides of the single links and connected thereto by means of link pins 58. The latter, at the outer ends have guide rollers 59. The guide rollers 56 and the guide rollers 59 are arranged in planes at substantially right angles, and serve to guide the chains in suitable guide channels 60 and 61, thereby eliminating to a large extent, the friction of the chains when traveling in the channels. The runs of the chains are substantially horizontal and the channels 60 serve to receive the upper runs and are of substantially U-shape for this purpose, the chains traveling longitudinally of the channels as is shown most clearly in Fig. 6. The channels 61, which receive the lower runs of the chains, are of inverted U-form with inwardly disposed flanges 62 at the lower edges to receive and support the guide rollers 56. At the ends 63 of the channels, the latter are outwardly flared to permit the chains to enter the channels without difficulty. Intermediate the shafts 49 and 50 the floor beams have further bearings 64 in which is journaled a shaft 65 having rigid fly wheels 66, and sprockets 67 and 68, of which the latter are rigidly keyed or otherwise secured to the shaft. The shafts 50 and 65 are operatively connected by means of chains 69 which operatively connect the sprockets 67, and sprockets 70 of the shaft 50. Electric generators 71 are mounted in position upon the floor beams and have a common driving shaft 72 provided with sprockets 73. The latter are operatively connected with the sprockets 68 of the shafts 65, by means of chains 74. It will be understood that the motors are driven in this manner from the shaft 50, through the intermediate shaft 65. The sprockets 67 of the intermediate shaft 65 are loosely positioned thereon, and at the opposite faces have pluralities of dogs 75 pivotally mounted in position. Ratchets 76 are firmly keyed or otherwise secured upon the shaft 65, and are adapted to be engaged by the dogs 75. Face plates 77 are mounted at the sides of the sprockets 67 by means of screws or bolts 78 and serve to cover the dogs and ratchets. This construction permits the rotation of the shaft 65 in one direction, inoperatively, with respect to the electric generators, and consequently, if the actuating mechanism should accidentally be moved in a direction opposite to the normal, the generators would not be retarded or stopped thereby.

At separated points of the chains 53 are provided brackets 79 rigid with certain of the links 54 and constituting laterally disposed ears. Uprights 80, at substantially right angles to the runs of the chains, are secured at the ears and are held in position by angularly disposed braces 81 having the ends remote from the uprights secured to other links of the chains. Vanes 82 are pivoted at the brackets 79 and are fashioned from sheet metal or other suitable material. They are provided at opposite edges with strengthening rims or flanges 83 connected by cross bars 84. The uprights 80 of the adjacent chains 53 are connected by crossed braces 85, and at their outer ends by connecting bars 86. The arrangement is such that when the vanes are on the lower runs of the chains they depend therefrom in substantially vertical planes, and adjacent to the uprights or supports therefor, so that the wave or other water movements impact thereagainst and drive the chains, the vanes being held in planes substantially at right angles to the runs of the chains, by the uprights or supports. In this way the waves cause the chains to move continuously and drive the shaft 50, the intermediate shaft 65, and the dynamo shaft 72, to actuate the dynamos or other power-producers. When the vanes are at the upper runs of the chains they lie in inoperative positions in planes substantially parallel to the planes of the runs, as is shown most clearly in Fig. 2. Consequently, any reflex wave movements cannot act to retard the movement of the chains; similarly, the reflex movements are inoperative with respect to the lower vanes, as the impact of the reflex waves thereagainst simply tends to swing them from the supports into inoperative positions to permit the water to pass therebeyond. The chains 53 move in the channels 60 and 61, the brackets 79 extending from the channels, as is shown most clearly in Fig. 3. In the inoperative position of the vanes the latter rest upon the upper rims of the channels 60 and slide along the same as the chains travel, or they may be supported by the chains themselves.

The wave or other water movements are naturally intermittent and therefore normally tend to produce an intermittent movement of the chains and a correspondingly intermittent driving of the power-producing generators. This would lead to inefficiency in the operation of the latter, and I therefore provide the fly-wheels 66. It will be remembered that owing to the dog-and-ratchet construction of the sprockets 67 the shaft 65 can rotate in an operative direction independently of the shaft 50 to which it is connected by the chains 69. Consequently, the momentum acquired by the fly-wheels will continue the movement of the shaft 65, and the driving of the power-producing generators, after the shaft 50 has ceased to rotate, and will continue this movement until the vanes and the shaft 50 are actuated by the succeeding wave.

The casing 15, mounted upon certain of the floor beams 12 contains storage battery or accumulator cells (not shown), in which a certain proportion of the electric energy produced by the generators 71 is stored. The remainder of the energy is conducted by suitable line wires to the point of utilization. The motor 18 draws its supply of current from that stored in the accumulator cells. This is also available, in case the wave motor should be temporarily disabled, for employment at the point of utilization of the electric energy produced by the wave motor.

Having thus described my invention, I claim as new and desire to secure by Letters Patent:

1. In a wave motor, endless flexible members arranged to travel continuously and having the runs substantially horizontal, vanes extending transversely of said members and pivoted thereto, said vanes, when on the lower runs of said members, being in substantially vertical planes, said members having means for bracing said vanes against displacement from their substantially vertical planes, when impacted against by waves coming from one direction.

2. In a wave motor, endless flexible members arranged to travel continuously, braces carried by said members and arranged at substantially right angles to the runs thereof, and vanes pivoted upon said members adjacent to said braces and adapted to be supported thereby, said vanes being free to swing in one direction.

3. In a wave motor, endless flexible members, guide means for the runs of said members, and vanes carried by said members and extending transversely from one to the other, each of said members having independent rollers adapted to engage said guide means, certain of said rollers being arranged at angles with others of said rollers.

4. In a wave motor, an endless flexible member arranged to travel continuously, guide channels arranged to receive the runs of said member, and vanes pivotally mounted upon said member, said member having means for bracing said vanes against impact from one direction only, said member having rollers for engaging said channels.

5. In a wave motor, an endless chain arranged to travel, channels arranged to receive the runs of said chain, said chain having rollers for engaging said channels, vanes pivotally mounted upon said chain, and braces secured rigidly to said chain and adapted to hold said vanes in planes substantially perpendicular to the runs of said chain, against impact from one direction.

6. In a wave motor, a plurality of endless chains arranged to travel, channels positioned to receive and guide the runs of said chains, vanes arranged transversely of said chains and pivotally secured to the runs thereof, and braces carried by said chains and adapted to hold said vanes in operative position against impact from one direction, said chains having rollers for engaging said channels.

7. In a wave motor, a frame, shafts mounted upon said frame, sprockets rigid with said shafts, endless chains arranged upon said sprockets, channels to receive and guide the runs of said chains, vanes arranged transversely of said chains and pivotally secured thereto, braces mounted upon said chains and arranged at substantially right angles to the runs thereof, said braces being formed to hold said vanes operative against impact from one direction, and rollers carried by said chains and adapted to travel in said channels, said channels having the ends outwardly flared.

8. In a wave motor, a frame, substantially parallel shafts journaled upon said frame, sprockets rigid with said shafts, endless chains arranged to travel upon said sprockets, the runs of said chains being substantially parallel to the water surface, channels positioned to receive and guide the upper runs of said chains, further channels positioned to receive and guide the lower runs of said chains, said further channels having at the lower edges inwardly disposed flanges, said chains having rollers arranged in planes at substantially right angles to each other and formed to engage said first channels at the bottom and the sides thereof, and said further channels, at the sides and the flanges thereof, vanes pivotally mounted upon said chains, and braces mounted upon said chains and adapted to hold said vanes operative against impact from one direction.

9. In a wave motor, a chain arranged to travel continuously and having vanes, and guiding means for said chain, said chain having rollers arranged in planes at substantially right angles and adapted to engage said guiding means.

10. In a wave motor, shafts, an endless flexible member operatively connecting said shafts and having means for its operation by wave impacts, a further shaft operatively connected with one of said first shafts, and power-producing means controlled by said further shaft, said further shaft having a fly-wheel, and being arranged to rotate in an operative direction independently of said first shafts.

11. In a wave motor, shafts, endless flexible members operatively connecting said shafts, wave-operable vanes carried by said members, a further shaft having a fly-wheel, means for operatively connecting one of said first shafts and said further shaft, whereby said further shaft is driven by said first shaft, said means being inoperative to rotate said further shaft in one direction, and power-producing mechanism controlled by said further shaft.

12. In a wave motor, shafts having sprockets, an endless chain mounted upon said sprockets, a further shaft, a further sprocket on one of said first shafts, a loose sprocket on said further shaft, a chain operatively connecting said further sprocket and said loose sprocket of said further shaft, a ratchet rigid with said further shaft, a dog secured to said sprocket of said further shaft and adapted operatively to engage said ratchet, and power-producing mechanism controlled by said further shaft.

13. In a wave motor, shafts, endless flexible members operatively connecting said shafts, wave-operable vanes carried by said members, a further shaft having a fly-wheel, means for operatively connecting one of said first shafts and said further shaft, whereby said further shaft is driven by said first shaft, said means being operative to rotate said further shaft in one direction only, power-producing mechanism controlled by said further shaft, and guide channels for the runs of said flexible members, said members having rollers adapted to engage at the inside of said guide channels, said vanes being pivotally mounted upon said members and being inoperative when impacted against by waves coming from one direction.

14. In a wave motor, a movable support, wave-operable mechanism carried upon said support, power-producing means controlled by said wave-operable mechanism, means for moving said support, and means for operating said last-mentioned means by the power produced by said power-producing means.

15. In a wave motor, a support adjustable in a substantially vertical direction, wave-operable mechanism carried by said support, power-producing mechanism controlled by said wave-operable mechanism, means for adjusting said support, a prime mover for driving said adjusting means, and means for delivering power to said prime mover from said power-producing mechanism.

16. In a wave motor, a plurality of uprights, a support movable longitudinally of said uprights and guidingly engaging the same, wave-operable mechanism carried by said support, power-producing mechanism carried by said support and controlled by said wave-operable mechanism, means for moving said support longitudinally of said uprights in both directions, a prime mover for operating said support-moving means, means for storing power produced by said power-producing mechanism, and means for driving said prime mover by the stored power.

17. In a wave motor, a plurality of uprights, a support movable longitudinally of said uprights and having rollers engaging the same, wave-operable mechanism carried by said support, power-producing mechanism carried by said support and controlled by said wave-operable mechanism, members engaging said support and serving to adjust the same longitudinally of said uprights in both directions, a prime mover for operating said members, means for storing power produced by said power-producing mechanism, and means for driving said prime mover by the stored power.

18. In a wave motor, a plurality of uprights, a support movable longitudinally of said uprights and guidingly engaging the same, wave-operable mechanism carried by said support, power-producing mechanism carried by said support and controlled by said wave-operable mechanism, threaded rods, said supports having correspondingly threaded collars engaging said rods, means for rotating said rods in both directions, and means for driving said last-mentioned means by the power produced by said power-producing mechanism.

19. In a wave motor, shafts, an endless flexible member operatively connecting said shafts and having vanes, said vanes being arranged to receive the wave impact and being movable into inoperative positions independently of one another, a further shaft operatively connected with one of said first shafts, and power-producing means controlled by said further shaft, said further shaft having a fly-wheel and being arranged to rotate in an operative direction independently of said first shafts.

20. In a wave motor, shafts, endless flexible members operatively connecting said shafts and arranged to travel continuously, braces carried by said members and positioned at substantially right angles to the runs of said members, wave-operable vanes pivoted upon said members adjacent to said braces and adapted to be supported thereby, said vanes being free to swing in one direction, a further shaft having a fly-wheel, means for operatively connecting one of said first shafts and said further shaft, whereby said further shaft is driven by said first shaft, said means being inoperative to rotate said further shaft in one direction, and power-producing mechanism controlled by said further shaft.

21. In a wave motor, a movable support, an endless flexible member arranged to travel upon said support, vanes carried by said member, said vanes being arranged to receive the wave impact and being movable into inoperative positions independently of one another, power-producing mechanism controlled by said member, means for moving said support to adjust it, and means for operating said last-mentioned means by the power produced by said power-producing mechanism.

22. In a wave motor, a support adjustable in a substantially vertical direction, endless flexible members arranged to travel continuously upon said support, braces carried by said members and positioned at angles to the runs of said members, vanes pivoted upon said members adjacent to said braces and adapted to be supported thereby, said vanes being free to swing in a direction away from said braces, prower-producing mechanism controlled by said members, means for adjusting said support, a prime mover for driving said adjusting means, and means for delivering power to said prime mover from said power-producing mechanism.

In testimony whereof I have signed my name to this specification in the presence of two subscribing witnesses.

EUGENE H. ANGELL.

Witnesses:
MURRAY W. BRIGGS,
J. IRVING READ.